United States Patent [19]

Hulsebos

[11] 4,027,864
[45] June 7, 1977

[54] PROCESS AND APPARATUS FOR RECOVERING DISSOLVED COPPER FROM SOLUTIONS CONTAINING COPPER

[75] Inventor: Jan Hulsebos, Cranbury, N.J.

[73] Assignee: Cities Service Company, Tulsa, Okla.

[22] Filed: June 16, 1976

[21] Appl. No.: 696,458

Related U.S. Application Data

[60] Continuation of Ser. No. 555,014, March 3, 1975, abandoned, which is a division of Ser. No. 293,616, Sept. 29, 1972, which is a continuation-in-part of Ser. No. 128,435, March 26, 1971, abandoned.

[52] U.S. Cl. ............................................. 266/170
[51] Int. Cl.² ........................................ C22B 15/12
[58] Field of Search ................. 75/97 A, 109, 117; 266/101, 122, 170

[56] References Cited

UNITED STATES PATENTS

| 528,023 | 10/1894 | Pelatan et al. | 266/101 |
|---|---|---|---|
| 576,173 | 2/1897 | Sulman | 266/170 |
| 1,217,437 | 2/1917 | Gahl | 75/109 |
| 3,154,411 | 10/1964 | Back et al. | 266/170 |
| 3,373,984 | 3/1968 | Valle | 266/101 |
| 3,529,724 | 9/1970 | Maciula et al. | 210/512 R |
| 3,560,201 | 2/1971 | Lefler et al. | 75/109 |
| 3,674,466 | 7/1972 | Anderson et al. | 75/117 |

*Primary Examiner*—Gerald A. Dost
*Attorney, Agent, or Firm*—John W. Carpenter

[57] ABSTRACT

A process and apparatus for recovering copper values from acidic solutions containing dissolved copper is disclosed. The process and apparatus comprises reacting in an intake line and feed pump powdered iron in the size range of up to −40 mesh with the solution to displace the copper therefrom as metallic copper, and separating the copper from the solution by settling the metallic copper in the bottom of a vessel known as a polishing tower. Preferably, the solution is clarified by passing it upwardly through a bed of scrap iron, after which the solution is centrifuged to remove particles therefrom.

3 Claims, 1 Drawing Figure

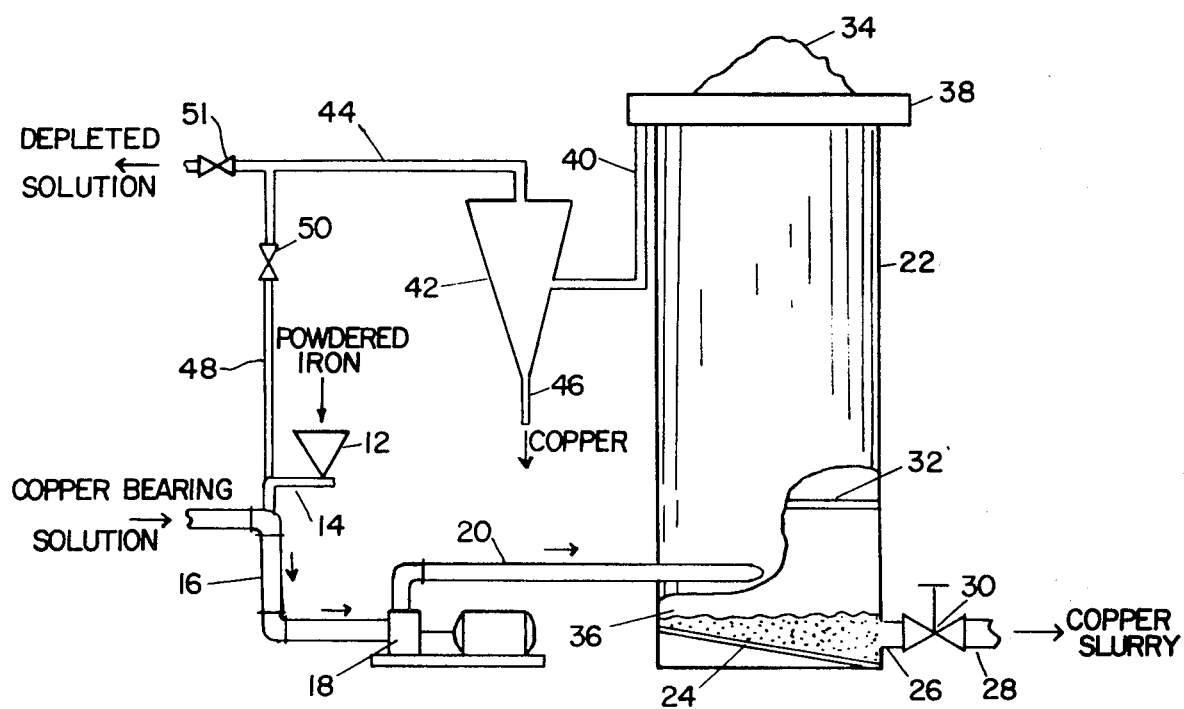

PROCESS AND APPARATUS FOR RECOVERING DISSOLVED COPPER FROM SOLUTIONS CONTAINING COPPER

This is a continuation, of application Ser. No. 555,014, abandoned, filed Mar. 3, 1975 which is a divisional application Ser. No. 293,616 filed Sept. 29, 1972 which a continuation-in-part application Ser. No. 128,435, filed Mar. 26, 1971 now abandoned.

BACKGROUND OF THE INVENTION

This invention relates to an improved process and apparatus for recovering copper values from various acidic, copper bearing solutions. More particularly, this invention relates to a process and apparatus which economically recovers the copper present in such streams.

Copper is an extremely valuable metal particularly in reference to other industrial commodities such as steel or aluminum. In addition, the quality of water resources and the environment dictate the desirability of treating industrial process streams to minimize waste and degradation. Mine water or acid water resulting from the processing of copper bearing ores represents one such industrial waste in terms of being acidic due to presence of sulfuric acid and containing copper dissolved therein in the form of soluble sulfates.

To recover copper from copper bearing solutions it has been conventional to use metallic iron since it displaces any element from solution which is higher in the electromotive series. One conventional process employs a mass of scrap iron having large surface area such as detinned, shredded steel cans through which the copper bearing solution is passed. Other more sophisticated approaches are presented in U.S. Pat. No. 3,154,411 issued Oct. 27, 1964 and 3,333,953 issued Aug. 1, 1967, both of which employ various types of apparatus to precipitate and recover the copper from mine water. The major deficiency of the latter patent is that the mixing is accomplished within the reaction container and does not involve initially reacting powdered iron with the copper bearing solution. This is an inefficient operation and does not maximize the recovery of copper values from copper bearing solutions.

SUMMARY OF THE INVENTION

Therefore, it is an object of the present invention to provide a process and apparatus for the improved recovery of copper from acidic copper solutions.

It is a further object of the present invention to provide a process and apparatus which maximizes the recovery of copper values from acidic copper bearing solution.

Broadly, this invention accomplishes its desired objects by an apparatus and process for recovering dissolved copper values from a solution containing copper which comprises means for mixing a powdered iron with the solution for a sufficient time to allow the iron to reduce the copper in the solution to metallic copper. A container is further provided wherein the means for mixing is tangentially connected so that the solution enters the container circumferentially to reduce the flow velocity of the solution containing metallic copper to allow the copper to settle to the bottom of the container. Finally, a means for withdrawing the settled metallic copper from the bottom of the container is provided. Preferentially, the process and apparatus additionally comprises passing the solution from the bottom of the container upwardly through a bed of scrap iron which further acts to trap residual copper particles entrained in the solution and to further precipitate any residual copper from the solution. The stream is then removed as overflow and centrifuged to separate the remaining particulate copper. The centrifuge stream is discarded, or preferably recycled to the means for mixing powdered iron with the solution containing copper in the amount of up to approximately 50% volume of the feed.

These, together with various ancillary objects and features which will become apparent to those artisans possessing ordinary skill in the art as the following description proceeds, are attained by this novel process and apparatus for recovering dissolved copper values from a solution containing copper. A preferred embodiment is shown in the accompanying drawing, by way of example only wherein:

BRIEF DESCRIPTION OF THE DRAWING

The drawing shows in schematic form one version of the process and apparatus embodying the present invention.

DESCRIPTION OF THE PREFERRED EMBODIMENT

With reference to the process and apparatus of my invention for effectively recovering copper values from acidic copper bearing solutions, as for instance copper sulfate in mine water, the copper is precipitated according to the equation:

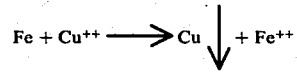

Excess acid in the solution also reacts with the iron thus aiding in neutralization of the solution. According to my process and apparatus, powdered iron in the size range of up to −40 mesh on the U.S. Sieve Scale is mixed with the copper bearing solution in amounts up to the stoicheiometrically required quantity in an extremely turbulent mixing zone. For instance, as shown in the drawing the powdered iron is introduced into a hopper or feeder 12 from a source, not shown, and metered through pipe 14 to a feed pipe 16 through which the copper bearing solution enters the system. The feed pipe 16 is connected to the intake of a pump 18 which serves to pump the slurry of solution and powdered iron into a reaction pipe 20 connected to the outlet of the pump. The reaction pipe is any suitably turbulent reaction zone wherein the copper bearing solution and the iron powder are rapidly and intimately mixed so that the reaction between the iron powder and the dissolved copper is substantially complete within the reaction pipe.

The outlet of the reaction pipe is connected tangentially to the bottom of a polishing tower 22. As shown, the reaction pipe connects to the side of the tower in a tangential position so that the reaction products and fluid enter the tower circumferentially to reduce the flow velocity of the solution containing metallic copper and allow metallic copper to settle into the bottom of the polishing tower 22. The tower 22 is a large volume cylindrical vessel which will flow toward a discharge port 26 located in the vessel side adjacent the low end of the tower bottom. A discharge pipe 28 is connected to the discharge port and serves to withdraw the settled copper slurry from the tower. A valve 30 is mounted in the discharge pipe to regulate the level of the copper slurry in the tower.

The reaction pipe is attached to the tower at an elevated level several feet above the upper level of the inclined bottom and opens tangentially into the tower. At a spaced distance above the inlet, a support grid 32 is horizontally mounted within the tower and serves to support a packed mass of scrap iron 34. The mass of scrap iron may be for instance detinned, shredded steel cans. In terms of function, the volumetric space within the tower and below the support grid constitutes a settling zone 36 for copper particles precipitated out of solution in the reaction pipe. The reaction product from the reaction pipe is therefore tangentially introduced into the settling zone 36, to rapidly dissipate the flow velocity of the fluid and thereby allow a maximum amount of copper particles to settle by both centrifugal force and gravity to the bottom of the zone.

The fluid leaves the settling zone by passing upwardly through the support grid 32 into the volume of scrap iron and is withdrawn from the tower via an overflow trough 38 surrounding the rim of the tower. The scrap iron serves the dual purpose of acting as reactant and as a filter, so that any copper particles entrained in the upwardly flowing solution are trapped or disengaged from the fluid before the fluid is withdrawn as overflow. The iron will react with any dissolved copper still present in the solution to further recover copper and neutralize the solution.

An overflow withdrawal pipe 40 is connected at one point to the overflow trough 38 and at its downstream to a cyclone separator 42. The cyclone separator serves to remove substantially all the remaining solid particles entrained in the fluid, which fluid is then discharged overhead through a fluid discharge pipe 44. The solids separated from the fluids in the cyclone are discharged through pipe 46 and comingled with cemented copper recovered elsewhere, if desired. A recycle pipe 48 connects the discharge pipe 44 to the feed pipe 16 from the feed hopper. A valve 50 is mounted in pipe 48 and a valve 51 is mounted in pipe 44 to monitor and control recycled liquid. The recycle rate of liquid to the feed of copper bearing solution is no more than 1:1, however, it is preferred that there be as little recycle of liquid as is possible.

It should be understood that while such a process and apparatus can be applied to various mine water solutions, it is equally adaptable to any dilute aqueous solutions of copper salts such as copper chloride, or nitrate.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An apparatus for recovering dissolved copper which comprises means for mixing a powdered iron with said solution for a sufficient time to allow said iron to reduce said copper in said solution to metallic copper, a container wherein said means for mixing is tangentially connected so that said solution enters said container circumferentially to reduce the flow velocity of said solution containing metallic copper to allow said copper to settle to the bottom of said container, means for withdrawing said settled metallic copper from the bottom of said container, said container additionally includes a means for supporting material containing iron, said means for supporting material containing iron includes a support grid horizontally mounted within said container supporting a mass of particulate scrap iron, said container is substantially cylindrical and said tangential connection of said means for mixing to said container is in the lower portion thereof and underneath said support grid, and said apparatus additionally includes a means for passing upwardly through said scrap iron a solution containing residual copper values, and a means for secondary removal of entrained residual copper valves from the solution passed upwardly through said scrap iron.

2. The apparatus of claim 1 wherein said mixing means comprises a hopper, a feed pipe connected to said hopper through which copper bearing solution flows, and a pump to said feed pipe which serves to pump said copper bearing solution and powdered iron into said container.

3. The apparatus of claim 1 wherein said secondary removal means comprises a cyclone separator.

* * * * *